United States Patent [19]

Anderson et al.

[11] Patent Number: 5,244,737
[45] Date of Patent: * Sep. 14, 1993

[54] ADDITION POLYMER PARTICLES

[75] Inventors: Geoffrey B. Anderson, Richmond, Australia; David S. Bignell, Berkshire, England; Iain B. Cook, West Brunswick, Australia; Bruce Leary, Red Hill, Australia; Christopher J. Lyons, Burwood, Australia

[73] Assignee: ICI Australia Operations Proprietary Limited, Melbourne, Australia

[*] Notice: The portion of the term of this patent subsequent to Aug. 25, 2009 has been disclaimed.

[21] Appl. No.: 896,607

[22] Filed: Jun. 10, 1992

Related U.S. Application Data

[63] Continuation of Ser. No. 497,849, Mar. 23, 1990, Pat. No. 5,141,814.

[30] Foreign Application Priority Data

Mar. 23, 1989 [AU] Australia .................. PJ3391

[51] Int. Cl.$^5$ .................................. B32B 27/04
[52] U.S. Cl. .................... 428/407; 428/402; 428/516; 428/519; 524/458; 524/512; 524/558; 524/459
[58] Field of Search ............... 428/407, 402, 516, 519; 524/458, 459, 562, 558

[56] References Cited

U.S. PATENT DOCUMENTS

| | | | |
|---|---|---|---|
| 4,322,328 | 3/1982 | Graetz et al. | 524/458 |
| 4,337,189 | 6/1982 | Bromley et al. | 523/332 |
| 4,390,658 | 6/1983 | Graetz et al. | 524/512 |
| 4,419,465 | 12/1983 | Backhouse et al. | 523/201 |
| 4,587,290 | 5/1986 | Davies et al. | 524/558 |
| 4,921,898 | 5/1990 | Lenney et al. | 524/459 |
| 5,141,814 | 8/1992 | Anderson et al. | 428/407 |

FOREIGN PATENT DOCUMENTS 1001715  5/1982  United Kingdom .

OTHER PUBLICATIONS

Akashi et al., *Journal of Polymer Science: Part A: Polymer Chemistry*, "Graft Copolymers Having Hydrophobic Backbone and Hydrophilic Branches. IV. A Copolymerization Study of Water-Soluble Oligovinylpyrrolidone Macromonomers", vol. 27, 3521-3530, Sep. 1989.

Miyauchi et al., *Journal of Polymer Science: Part A: Polymer Chemistry*, "Graft Copolymers Having Hydrophobic Backbone and Hydropholic Branches. III. Synthesis of Graft Copolymers Having Oligovinylpyrrolidone as Hydrophilic Branch", vol. 26, 1561-1571, Jun. 1988.

*Primary Examiner*—John Kight, III
*Assistant Examiner*—D. V. C. Teuong
*Attorney, Agent, or Firm*—Cushman, Darby & Cushman

[57] ABSTRACT

Very small (100 nanometres maximum) non-ionically-stabilised core-sheath addition polymer particles, wherein the core is addition polymer and the sheath polyoxyalkylene chains, at least a portion of which chains are bonded to the core, there being present on each core sufficient chains such that the mass ratio of core to sheath is from 98:2 to 60:40. The particles are prepared by polymerisation in aqueous media initiated at under 40° C. In a preferred embodiment, a seed-feed process is used. The dispersions exhibit excellent rheological characteristics and are useful, for example, as film-formers in coating compositions.

15 Claims, No Drawings

ADDITION POLYMER PARTICLES

This is a continuation of application Ser. No. 07/497,849 filed Mar. 23, 1990 now U.S. Pat. No. 5,141,814.

This invention relates to very small addition polymer particles having a core-sheath structure.

One means of stabilisation of disperse particles in liquid continuous media with which the material of the particles is incompatible is steric stabilisation. In this technique, the disperse particles comprise at their surface chemical species which are solvatable by the continuous phase and which accordingly form a solvated stabilising sheath around the particles. Steric stabilisation can be used either in aqueous or non-aqueous media. The first extensive use of steric stabilisation was in the field of dispersion polymerisation in non-aqueous media and the background and details are well described in the authoritative text "Dispersion Polymerization in Organic Media" (K. E. J. Barrett, Ed., Wiley-Interscience, 1975). On page 39 of this text, Barrett describes the stability of such a system to be the result of a "sheath of soluble polymer chains", hence the description of the particles which are stabilised by a steric stabilisation mechanism as "core-sheath" particles.

A further authoritative reference in the field is "Polymeric Stabilisation of Colloidal Dispersions" by D. H. Napper (Academic Press, 1983). On page 14, Napper presents a schematic representation of steric stabilisation which clearly shows the core-sheath structure of the particles. It is worth noting that the other common method of particle stabilisation, ionic stabilisation, does not involve the provision of such a sheath.

Much of the work in the field has been done with non-aqueous dispersions, but more recently there has been interest in using steric stabilisation in aqueous media. The advantages of steric stabilisation in aqueous media are considerable; sterically-stabilised dispersions are relatively insensitive to pH changes and to the presence of electrolytes. One practical advantage attainable in the surface coatings field is enhanced freeze-thaw stability.

There has been considerable interest in making very small disperse polymer particles of below 100 nanometres (nm) (0.1 micron) for a variety of reasons. For example, in the field of surface coatings, the smaller the particle size of the film-former the better the penetration into porous substrates and the more nearly the gloss level of the resultant film approaches that of coating compositions wherein the film is laid down from solution. There has been a particular interest in water-borne coating compositions which have a high gloss level and good rheology. An example of such a system is found in U.S. Pat. No. 3,740,367 wherein 95% of the particles are stated to have diameters of less than 100 nm. However, the compositions disclosed in this document, which are not core-sheath particles, rely on ionic stabilisation which of course does not provide the benefits obtainable by steric stabilisation. This may have been the reason for the lack of commercial success of compositions based on U.S. Pat. No. 3,740,367.

It has now been found that it is possible to prepare very small core-sheath particles of addition polymer, which particles form stable aqueous dispersions. There are therefore provided, according to the present invention, polymer particles of 100 nm maximum average diameter and having a core-sheath structure, the core comprising addition polymer and the sheath comprising polyoxyalkylene chains of average length of from 6 to 40 oxyalkylene units per chain, at least a portion of these chains being covalently bonded to the core and there being present on each core sufficient chains such that the mass ratio of core to sheath is from 98:2 to 60:40.

The particles of this invention have water-insoluble cores which comprise addition polymer, that is, polymer prepared by the chain growth polymerisation of ethylenically unsaturated monomer. Most of the monomers commonly used in such polymerisations can be used, for example the $C_1$-$C_{12}$ (preferably the $C_1$-$C_4$) alkyl acrylates and methacrylates, styrene, (meth)allyl acrylates and methacrylates, glycidyl methacrylate and vinyl acetate. In addition, substantial quantities of water-soluble monomers may be used, provided that the core remains water-insoluble. A typical example of such a monomer is hydroxypropyl acrylate. Also useful are monomers to which are bonded polyoxyalkylene chains. It is possible to crosslink the polymer particles by using a monomer with two or more double bonds per molecule—one suitable monomer is trimethylolpropane triacrylate. Because of the inherent good stability of aqueous dispersions of the particles of the present invention in the presence of ionic species, small proportions of ionisable monomers such as acrylic and methacrylic acids may be tolerated. Such monomers will typically comprise no more than 5% of the mass of the core polymer.

The sheaths of the particles of this invention comprise polyoxyalkylene chains, that is, chains which are made up of oxyalkylene units of the general formula —($CR_1R_2$—$CH_2$—O)— wherein $R_1$ and $R_2$ are independently hydrogen or $C_1$-$C_4$ alkyl groups. The requirement that the particles be stable in aqueous dispersion dictates that the polyoxyalkylene chains will have an overall hydrophilicity. In practice, this means that most of the oxyalkylene units will be oxyethylene units, with a minor proportion of oxypropylene and oxybutylene units, the last-named two being used to adjust the degree of hydrophilicity of the chains. The oxypropylene and oxybutylene units are preferably located at one or both ends of the chain. The chains may vary in length from 6 to 40 oxyalkylene units and are present in such quantity that the mass ratio of core to sheath is from 98:2 to 60:40. Preferred chain lengths are 8-25, more preferably 10-25, oxyalkylene units and preferred mass ratios are from 95:5 to 85:15. The particles are on average less than 100 nm, preferably 20-80 nm and more preferably 30-65 nm in diameter.

It should be noted at this point that the mass of the core is considered to include the mass of any water-insoluble components which may be attached to the polyoxyalkylene chains. Such components typically comprise reactive groups and hydrophobic moieties; these are further discussed in the following paragraphs.

It is a requirement of this invention that at least a portion of the polyoxyalkylene chains be chemically bonded to the core. This may be achieved by any convenient means such as arranging that the surface of the core have reactive groups and then reacting these groups with polyoxyalkylene chains to which are attached suitable complementary reactive groups. An especially valuable alternative is to provide the chains with hydrophobic moieties which comprise ethylenic double bonds which can react with the monomer of the core during the formation of the particles. Examples of particularly useful chains of this type are alkoxylated diethylenically unsaturated fatty alcohols, especially those disclosed in copending Australian Patent Application No. (AUS 1459), but there are many other types of unsaturated non-ionic compounds which would achieve similar results, for example, ethoxylated hydroxy butyl acrylate and the surfactants of Australian Patent No. 564,046. A third way of introducing such chains is to use an alkoxylated addition monomer such as ethoxylated methacrylic acid in the monomer mixture.

It is permissible for the sheath of the particles also to have a proportion of polyoxyalkylene chains which are not chemically bonded to the core polymer. This may happen naturally as there will usually be a proportion of the abovementioned double bond-containing chains which will not react but which will be physically adsorbed. However, polyoxyalkylene chains which comprise no unsaturation may also be used. Typical examples are polyoxyalkylene chains which have at one end a hydrophobic moiety which lacks any ethylenic unsaturation. Typical examples of suitable compounds include block copolymers of polyoxybutylene and polyoxyethylene and nonyl phenol ethoxylates. Compounds of this type are commonly available, for example, the range of non-ionic surfactants sold by ICI Australia under the trade mark "Teric". The proportion of polyoxyalkylene chains which must be bonded to the core varies considerably according to such factors as core and sheath compositions and relative proportions of core and sheath. In some cases, only a small proportion need be bonded, in other cases a substantial majority.

It has been found that, as a general rule, at least 20% of the polyoxyalkylene chains should be bonded to the core. More preferably, 50% of the chains, and most preferably as many of the chains as possible are bonded to the core; 100% of bonded chains is theoretically possible but difficult to achieve in practice.

Aqueous dispersions of particles according to this invention are robust with respect to the presence of ionic species in comparison with ionically-stabilised particles, and no problems will be encountered as a result of the presence of such species as ionic catalyst residues. Moreover, the dispersions can tolerate the addition of ionic materials in quantities which are common in the art. For example, in the formulation of paint compositions, it is common to use ionic surfactants, for example as pigment dispersants. The presence of such species in art-recognised quantities does not affect the stability or properties of the dispersions.

A process for the preparation of particles according to the invention is carried out in aqueous media. The invention therefore provides a process for the preparation of core-sheath addition polymer particles by the polymerisation of ethylenically unsaturated monomer in aqueous medium in the presence of solvated polyoxyalkylene chains which comprise hydrophobic moieties, at least some of which moieties comprise at least one ethylenic double bond such that the ethylenic double bond of those moieties comprising one such bond be in a pendant or a terminal position, the polyoxyalkylene chains having a chain length of from 6-40 oxyalkylene units, the mass ratio of core to sheath being from 98:2 to 60:40, and polymerisation being initiated at under 40° C.

The initiation of polymerisation at the unusually low temperature of under 40° C. has been found to be essential for the purposes of this invention. Similarly, it has been found essential that, where there is used a solvated polyoxyalkylene chain with a hydrophobic moiety comprising a single ethylenic double bond, this bond be in a terminal or pendant position and that it not be a non-terminal link in a continuous chain of carbon-carbon links, such as is found for example in oleic acid, a common surfactant component. Should the hydrophobic moiety comprise more than one ethylenic double bond, these bonds need not be pendant or terminal, although it is permissible for them to be so.

In a typical process, monomer, polyoxyalkylene chain and hydrophobic moiety-containing compound (hereinafter "amphiphile"), water and a peroxy compound are mixed to form a milky emulsion. The temperature of the emulsion is then reduced to below 40° C., preferably below 20° C. and most preferably in the range of from 0°-10° C. and polymerisation initiated by adding a reductant for the peroxy compound. The resulting exotherm is controlled to below 50° C., and preferably below 30° C. using external cooling. The initial milkiness of the mixture reduces as the reaction proceeds such that a translucent product is formed by the end of the polymerisation period (1-2 hours). Sufficient stirring is used to keep the mixture homogeneous and temperature low and uniform.

In this process, the quantities of materials used typically range from a mass ratio of monomer to amphiphile of 50:50 to one of 92:8, and the mass ratio of monomer+amphiphile to water is from 20:80 to 60:40.

In an especially preferred embodiment of the invention, the process as hereinabove described may be performed as a seed-feed process, rather than as a single step process. The invention therefore provides a process as hereinabove defined, wherein the particles are formed in two stages, a seed stage and a feed stage, characterised in that (i) in the seed stage, the mass ratio of monomer to amphiphile is from 80:20 to 20:80 and the monomer+amphiphile to water ratio is from 20:80 to 40:60;

(ii) in the feed stage, the feed has a monomer to amphiphile ratio of from 75:25 to 99:1 and a monomer+amphiphile to water ratio is from 40:60 to 90:10; and (iii) the mass ratio of seed stage monomer to feed stage monomer is 1:20 maximum.

The seed-feed process is generally carried out by one of two methods. In the first method, there is formed seed polymer particles to which an emulsified monomer feed is added. In the second method, there is formed a seed emulsion of unpolymerised monomer to which an emulsified monomer feed is added, polymerisation only being initiated when this feed is being added—a preferred technique here is to include one component of the polymerisation initiator in the seed emulsion and include the others in the feed.

In a preferred embodiment of this invention when there is included in the monomer monomer to which is attached polyoxyalkylene chains (such as methacrylic acid ethoxylate), the particles according to this invention are prepared by a seed-feed process. In a more preferred embodiment, this monomer is included only in the feed stage.

The particles of the invention may be used, for example, in aqueous dispersions which are useful as film-formers in coating compositions. The invention therefore also provides a coating composition whose film-former is an aqueous dispersion of particles as hereinabove described. The coating compositions may be prepared by blending standard ingredients such as pigments, extenders, antifoams, thickeners and fungicides into the dispersion in art-recognised quantities using known methods. The aqueous dispersions have high solids contents and the excellent rheology exhibited by the dispersions ensures that the solids content need not be diluted, thus rendering unnecessary the addition of the usual quantities of rheology-modifying additives generally used in known coating compositions. The resulting coating films have good film build and properties.

The invention is further illustrated by the following example in which all parts are expressed by mass.

EXAMPLE 1

Preparation of particles of about 50 nm diameter, having a formulated core: sheath mass ratio of 88:12, the polyoxyalkylene chains having on average about 10 oxyethylene units. The process is a single stage process.

The following components were weighed into a reaction vessel:

| | |
|---|---|
| deionised water | 44.38 parts |
| methyl methacrylate | 27.95 " |
| butyl acrylate | 9.55 " |
| tert-butyl perbenzoate | 0.75 " |
| "Ocenol" 110–130 ethoxylated with 10 moles ethylene oxide per mole of "Ocenol" | 12.50 " |

("Ocenol" 110–130 (ex Henkel KGaA) is a commercially-available blend of $C_{18}$ straight chain unsaturated alcohols having on average about 1.6 ethylenic double bonds per molecule. "Ocenol" is a trade mark).

The mixture was stirred and 30% w/w hydrochloric acid was added until a pH of less than 4 was achieved (0.2 parts was required). The mixture was cooled by means of an ice bath to less than 6° C. and 4.13 parts of a 10% w/w aqueous solution of sodium erythorbate and then 0.75 parts of a 1% w/w aqueous solution of ferrous sulphate heptahydrate were added. Stirring was maintained as was external cooling to keep the exotherm temperature from exceeding 35° C. The peak temperature was reached at about 15 minutes after the erythorbate/ferrous sulphate addition and stirring was continued for a further two hours.

The product was a translucent dispersion with a weight solids content of 50%. Examination by electron microscopy revealed particles of fairly uniform particle diameter of about 50 nm. Particle size measurements taken in a "Nanosizer" (trade mark) particle size measurement apparatus gave a diameter of 57 nm with a polydispersity of 4.

The proportion of polyoxyalkylene chains reacted on to the particles was determined to be 25% by GPC analysis of peak height at the retention time of the unreacted (not covalently bonded) chains.

The rheology and solids content of the dispersion rendered it ideal for use in a coating composition—it was found that none of the conventional rheology modifiers were needed. Viscosities were found to be as follows:

Viscosity (ICI cone and plate viscometer)
at 10,000 s$^{-1}$ 1.1 poise

Viscosity (Haake RV100 viscometer) in the range
10–100 s$^{-1}$ 10 poise

This shows that the dispersion had rheological characteristics which were close to Newtonian in the low to medium shear rate range. In a paint which utilised the dispersion as a film-former, this gave very favourable brush pick-up, in-can appearance and excellent flow out, leading to the absence or near absence of brush marks in final film. The dispersion shear-thinned to about 1 poise at high shear rates (typical of those encountered during paint brushing), and this endowed the paint with excellent brushing properties.

Paint compositions formulated using the dispersion as film-former exhibited these excellent properties without the need to use added rheology-modifying agents. This additionally had the effect of keeping high the solids content and ensuring good film build on application.

EXAMPLE 2

Preparation of particles of about 45 nm diameter, having a formulated core: sheath mass ratio of 90:10, the polyoxyalkylene chains having an average about 10 oxyethylene units. The process is a seed-feed process wherein no polymerisation is initiated until the feed has begun (hereinafter referred to as "Type A").

The following materials and proportions were used:

| | Seed Stage | Feed Stage |
|---|---|---|
| "Ocenol" 110–130 ethoxylated as in Example 1 | 5.172 | 3.000 |
| methyl methacrylate | 4.724 | 21.348 |
| butyl acrylate | 3.036 | 13.720 |
| t-butyl perbenzoate | 0.856 | — |
| solution A[1] | — | 4.708 |
| solution B[2] | 0.856 | — |
| deionised water | 28.460 | 14.120 |

[1]A solution of 1 part sodium ethoxylate in 10 parts deionised water
[2]Solution of 1 part ferrous sulphate heptahydrate in 99 parts deionised water The seed stage materials were mixed, stirred and adjusted in pH to 4 with 30% w/w hydrochloric acid. The mixture was then cooled to 7° C. and the feed stage was added over a period of 1 hour. During this period, the mixture exothermed but the temperature was kept below 30° C. by means of external cooling.

The product was a translucent dispersion of polymer. The weight solids of the dispersion was 51% and, the particle diameter was 45 nm as measured by small angle x-ray scattering (SAXS) and 65 nm, polydispersity 5, as measured by "Nanosizer" apparatus.

EXAMPLE 3

Preparation of particles of about 50 nm diameter, having a formulated core: sheath mass ratio of 89:11, the polyoxyalkylene chains having on average about 9.3 oxyethylene units. This example was a Type A seed-feed process (see Example 2) and ethoxylated methacrylic acid provided part of the sheath.

Example 2 was repeated, except that the ethoxylated "Ocenol" 110–130 was replaced by the following materials:

| | Seed Stage | Feed Stage |
|---|---|---|
| "Ocenol" 110–130 ethoxylated as in Example 1 | 5.172 | 0.548 |
| ethoxylated methacrylic acid[1] | — | 2.452 |

[1]"Blemmer" (trade mark) PE350 ex Nippon Oils and Fats Co. Ltd. was used.

and that the mixture was maintained at below 30° C.

The product was a translucent dispersion of polymer particles. The weight solids of the dispersion was 51% and particle diameter was 50 nm by SAXS and 85 nm with a polydispersity of 3 by "Nanosizer" apparatus.

EXAMPLE 4

Preparation of particles of about 43 nm diameter, having a formulated core:sheath mass ratio of 88:12, the polyoxyalkylene chains having on average about 13 oxyethylene units. This example was a Type A seed-feed process (see Example 2) and derived its covalently bound sheath entirely from ethoxylated methacrylic acid.

Example 3 was repeated except that the ethoxylated "Ocenol" 110-130 was replaced by the same quantities in the stages of a nonylphenol-15 ethylene oxide surfactant (the actual surfactant used was "Teric" (Trade Mark) N15 ex ICI Australia Limited).

The product was a translucent dispersion of polymer particles. The dispersion weight solids was 51% and the particle diameter was 43 nm (by electron microscopy) and 52 nm, polydispersity 2 (by "Nanosizer" apparatus). GPC studies showed that 32% of the polyoxyalkylene chains were bonded to the surface.

EXAMPLE 5

Preparation of particles of about 57 nm diameter, having a formulated core:sheath mass ratio of 92:8, the polyoxyalkylene chains having on average about 10 ethylene oxide units. This example uses a Type A seed-feed process (see Example 2).

The following materials and quantities were used

|  | Seed Stage | Feed Stage |
|---|---|---|
| "Ocenol" 110-130 ethoxylated with 10 moles ethylene oxide | 2.028 | 4.348 |
| methyl methacrylate | 1.760 | 23.060 |
| butyl acrylate | 1.280 | 17.526 |
| t-butyl perbenzoate | 0.892 | — |
| solution A[1] | — | 4.906 |
| solution B[1] | 0.892 | — |
| deionised water | 10.004 | 33.304 |

[1]These are the same as those used in Example 2

The method used was that of Example 2.

The result was a translucent dispersion of polymer particles. The weight solids of the dispersion was 51% and particle diameter was 57 nm (as measured by electron microscopy) 70 nm (polydispersity 3) (by "Nanosizer" apparatus). NMR studies showed that 45% of the polyoxyalkylene chains were covalently bonded to the particles.

EXAMPLE 6

Preparation of particles of polymer of about 68 nm diameter, having a formulated core:sheath mass ratio of 90:10, the polyoxyalkylene chains having on average about 10 ethylene oxide units. In this example, there is used a seed-feed process wherein the seed stage is polymerised prior to the addition of the feed stage. This is hereinafter referred to as a "Type B" process.

The materials and total quantities of Example 2 were used, but with some differences as to the quantities used at particular stages in the process, as shall be apparent from the following description of the method.

The seed stage of Example 2, from which the t-butyl perbenzoate had been omitted, was cooled to 7° C. and its pH adjusted to 3.0. To this cooled seed stage, 0.155 parts t-butyl perbenzoate, 1.555 parts of Solution A and 0.155 parts of Solution B were added. Polymerisation commenced with this addition and the mixture was allowed to exotherm and then allowed to cool to room temperature. The remaining solution and t-butyl perbenzoate were added to the seed stage and the remaining Solution A was added to the feed stage and the feed stage was added over a period of 1 hour.

The resulting translucent dispersion of polymer particles had a weight solids content of 51% and the particle diameter, as measured by "Nanosizer" apparatus, was 68 nm (polydispersity 3).

EXAMPLE 7

Preparation of particles of polymer of about 62 nm diameter having a formulated core:sheath mass ratio of 87:13, the polyoxyalkylene chains having on average about 15 ethylene oxide units. This example was a Type A seed-feed process (see Example 2) and sheath material is provided by ethoxylated undecylenic acid and ethoxylated methacrylic acid.

This example was identical to Example 3 except for the following alterations:
 (a) the ethoxylated "Ocenol" 110-130 was replaced by the same quantity of an ethoxylated undecylenic acid, this having on average 17.5 ethylene oxide units per undecylenic acid molecule;
 (b) the quantities of methyl methacrylate and butyl acrylate used were as follows:

|  | Seed stage | Feed stage |
|---|---|---|
| methyl methacrylate | 4.491 | 20.298 |
| butyl acrylate | 3.368 | 14.771 |

The preparation was carried out as described in Example 2 and the product was a translucent dispersion of weight solids content 51%. The particle size, as measured by "Nanosizer" apparatus was 62 nm (polydispersity 5).

EXAMPLE 8

Preparation of particles of polymer of 65 nm diameter, having a formulated core:sheath mass ratio of 87.5:12.5, the polyoxyalkylene chains having on average about 10 ethylene oxide units. In this example, there is used a seed-feed process of Type A (see Example 2) and there is used a single monomer (styrene).

The materials and quantities used were as follows:

|  | Seed Stage | Feed Stage |
|---|---|---|
| "Ocenol" 110-130 ethoxylate as used in Example 1 | 5.172 | 5.028 |
| styrene | 7.759 | 33.041 |
| t-butyl perbenzoate | 0.816 | — |
| solution A[1] | — | 4.488 |
| solution B[1] | 0.816 | — |
| deionised water | 28.540 | 14.340 |

[1]As used in Example 2

The preparation was carried out as described in Example 3 and the product was a translucent dispersion of polymer particles of weight solids content 51%. The particle size, as determined by "Nanosizer" apparatus was 65 nm (polydispersity 3).

EXAMPLE 9

Preparation of particles of polymer of 47 nm diameter, having a formulated core:sheath mass ratio of 84:16, the polyoxyalkylene chains having on average about 10 ethylene oxide units. In this example, there is used as seed-feed process of Type A (see Example 2) and there is used a single monomer (butyl acrylate).

The materials and quantities used were as follows:

|  | Seed Stage | Feed Stage |
|---|---|---|
| "Ocenol" 110-130 ethoxylate as used in Example 1 | 5.172 | 6.078 |
| butyl acrylate | 7.759 | 25.991 |
| t-butyl perbenzoate | 0.675 | — |
| solution A[1] | — | 3.713 |
| solution B[1] | 0.675 | — |
| deionised water | 28.822 | 12.115 |

[1]As used in Example 2

The preparation was carried out as described in Example 3 and the product was a translucent dispersion of polymer particles of weight solids content 45%. The particle size, as determined by "Nanosizer" apparatus was 47 nm (polydispersity 4).

EXAMPLE 10

Preparation of particles of polymer of about 82 nm diameter having a formulated core:sheath mass ratio of 90:10, the polyoxyalkylene chains having on average about 10 ethylene oxide units. This example was a Type A seed-feed process and utilises an adhesion-promoting monomer.

The materials and quantities used were as follows:

|  | Seed Stage | Feed Stage |
|---|---|---|
| "Ocenol" 110-130 ethoxylate as used in Example 1 | 5.172 | 3.161 |
| methyl methacrylate | 3.917 | 18.129 |
| butyl acrylate | 3.687 | 17.061 |
| t-butyl perbenzoate | 0.873 | — |
| solution A[1] | — | 4.804 |
| solution B[1] | 0.873 | — |
| deionised water | 28.426 | 13.024 |
| adhesion-promoting monomer[2] | — | 0.873 |

[1]As used in Example 2
[2]"Sipomer" (trade mark) WAM ex Alcolac Inc. was used

The method used in this preparation was that of Example 3. The result was a translucent dispersion of polymer particles of weight solids content 52%. The particle size, as measured by "Nanosizer" apparatus, was 82 nm (polydispersity 4).

EXAMPLE 11

Preparation of polyvinyl acetate particles of about 72 nm diameter, having a formulated core:sheath mass ratio of 87:13, the polyoxyalkylene chains having on average about 22 ethylene oxide units. In this example, a Type A seed-feed process (see Example 2) is used.

The materials and quantities used were as follows:

|  | Seed Stage | Feed Stage |
|---|---|---|
| undecylenic acid ethoxylate (as used in Example 7) | 3.150 | 3.684 |
| surfactant[1] | 0.408 | 1.092 |
| vinyl acetate | 4.055 | 39.611 |
| 70% butyl hydroperoxide in water | 0.579 | — |
| Solution B[2] | 0.873 | — |
| 10% sodium formaldehyde sulphoxylate | — | 2.99 |
| borax solution (1 part in 10 parts deionised water) | 2.75 | — |
| deionised water | 14.710 | 26.026 |

[1]"Teric" (ex ICI Australia) was used
[2]As used in Example 2

The preparation was carried out as described in Example 3 except that the feed stage was added over 2 hours, with half being added in the first 30 minutes.

The product was a translucent dispersion of polymer particles of weight solids content 52%. The particle diameter, as measured by "Nanosizer" apparatus, was 72 nm (polydispersity 3).

EXAMPLE 12

Preparation of polymer particles of about 47 nm diameter, having a formulated core: sheath mass ratio of 75:25, the polyoxyalkylene chains having on average about 10.3 ethylene oxide units. In this example, a single stage process is used.

The materials and quantities used were as follows:

| PETAE ethoxylate[1] | 17.854 |
|---|---|
| methyl methacrylate | 27.322 |
| TMPTA[2] | 4.822 |
| t-butyl perbenzoate | 0.664 |
| solution A[3] | 8.845 |
| solution B[3] | 0.644 |
| deionised water | 45.178 |

[1]The reaction product of 1 mole pentaerythitol triallyl ether with 2 moles butylene oxide and 10.3 moles of ethylene oxide.
[2]trimethylolpropane triacrylate
[3]As used in Example 2.

The method used for this preparation was identical to that of Example 1. The result was a translucent dispersion of polymer particles with weight solids content 50%. The particle diameter, as measured by "Nanosizer" apparatus, was 47 nm (polydispersity 3).

EXAMPLE 13

Preparation of polymer particles of about 59 nm diameter, having a formulated core: sheath mass ratio of 90:10, the polyoxyalkylene chains having on average about 10 ethylene oxide units. In this example, an ionic initiation system was used.

Example 2 was repeated but with the t-butyl perbenzoate and solution A of that example replaced respectively by identical quantities of ammonium persulphate and a solution of 1 part sodium metabisulphite to 5 parts deionised water.

The product was a translucent dispersion of polymer. The weight solids of the dispersion was 51% and the particle diameter was 59 nm, polydispersity 4 as measured by "Nanosizer" apparatus.

EXAMPLE 14

Preparation of a semi-gloss coating composition using an aqueous dispersion of polymer particles according to the invention.

The following materials and quantities were used:

|  |  | Parts |
|---|---|---|
| A. | propylene glycol | 9.167 |
|  | opaque polymer particles[1] | 12.488 |
|  | ammonia solution | 0.500 |

| | | Parts |
|---|---|---|
| | antifoam[2] | 0.300 |
| | dispersant[3] | 0.117 |
| | dispersant[4] | 0.167 |
| B. | titanium dioxide pigment[5] | 25.439 |
| | silica extender[6] | 1.000 |
| C. | aqueous dispersion (from Example 3) | 49.291 |
| | fungicide[7] | 0.080 |
| | thickener[8] | 1.450 |

[1]"Ropaque" (trade mark) OP62 ex Rohm and Haas Co. was used.
[2]"Bevaloid" (trade mark) 4226 ex Bevaloid Australia was used.
[3]"Orotan" (trade mark) 731 ex Rohm and Haas Co. was used.
[4]"Triton" (trade mark) X405 ex Rohm and Haas was used.
[5]"Tioxide" (trade mark) RHD2 ex Tioxide Australia was used.
[6]"Celatom" (trade mark) MW27 ex Eagle Picher was used.
[7]"Proxel" (trade mark) GXL ex ICI Australia was used.
[8]OR708 ex Rohm and Haas was used.

The A stage materials were mixed and the B stage materials added thereto. The mixture was stirred for 15 minutes at high speed and the C stage materials were then added with moderate stirring.

The paint when applied exhibits good early water resistance, fast dry, excellent washability with conventional household cleaner, improved opacity over that exhibited by conventional systems, good adhesion to aged alkyl enamel and low odour.

The coating when applied exhibited a richer fuller finish compared to conventional waterborne systems, as a result of its higher volume solids. The coating had good brush, roller and spray application with good flowout of imperfections such as brush marks.

We claim:

1. Polymer particles of 100 nm maximum average diameter and having a core-sheath structure, the core comprising addition polymer and being water insoluble and the sheath comprising polyoxyalkylene chains of average length of from 6 to 40 oxyalkylene units per chain, at least a 20 percent of these chains being covalently bonded to the core and there being present on each core sufficient chains such that the mass ratio of core to sheath is from 98:2 to 60:40.

2. Polymer particles according to claim 1, wherein the average length of the polyoxyalkylene chains is from 8 to 25 alkylene oxide units.

3. Polymer particles according to claim 1, wherein the average length of the polyoxyalkylene chains is from 10 to 25 alkylene oxide units.

4. Polymer particles according to any one of claim 1-3, wherein the mass ratio of core to sheath is from 95:5 to 85:15.

5. Polymer particles according to claim 1, wherein the average particle diameter is from 20–80 nm.

6. Polymer particles according to claim 1, wherein the average particle diameter is from 30–65 nm.

7. Polymer particles according to claim 1, wherein the polyoxyalkylene chains consist mainly of oxyethylene units with a minor proportion of oxyalkylene units selected from oxypropylene and oxybutylene units.

8. Polymer particles according to claim 1, wherein the polyoxyalkylene chains consist entirely of oxyethylene units.

9. Polymer particles according to claim 1, wherein at least 20% of the polyoxyalkylene chains are bonded to the core.

10. Polymer particles according to claim 1, wherein at least 50% of the polyoxyalkylene chains are bonded to the core.

11. Polymer particles according to claim 1, wherein a maximum of polyoxyalkylene chains is bonded to the core.

12. Polymer particles according to claim 1, wherein polyoxyalkylene chains are provided by at least one alkoxylated diethylenically unsaturated fatty alcohol.

13. Polymer particles according to claim 1, wherein polyoxyalkylene chains are provided by alkoxylated monomer.

14. Polymer particles according to claim 13, wherein the alkoxylated monomer is ethoxylated methacrylic acid.

15. A coating composition whose film-former is an aqueous dispersion of particles according to of claim 1.

* * * * *